US007096428B2

(12) United States Patent
Foote et al.

(10) Patent No.: US 7,096,428 B2
(45) Date of Patent: Aug. 22, 2006

(54) SYSTEMS AND METHODS FOR PROVIDING A SPATIALLY INDEXED PANORAMIC VIDEO

(75) Inventors: Jonathan T. Foote, Menlo Park, CA (US); Donald G. Kimber, Montara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 523 days.

(21) Appl. No.: 10/115,959

(22) Filed: Apr. 5, 2002

(65) Prior Publication Data

US 2003/0063133 A1 Apr. 3, 2003

Related U.S. Application Data

(60) Provisional application No. 60/325,172, filed on Sep. 28, 2001.

(51) Int. Cl.
*G06F 3/00* (2006.01)
(52) U.S. Cl. ............... 715/721; 715/719; 715/716
(58) Field of Classification Search ......... 715/719, 715/716, 723, 727, 730, 733, 848, 850, 501.1, 715/721; 348/36, 37, 38; 352/69, 70, 71
See application file for complete search history.

(56) References Cited

U.S. PATENT DOCUMENTS

| 6,002,853 | A | * | 12/1999 | de Hond ............... 709/219 |
| 6,121,966 | A | * | 9/2000 | Teodosio et al. ......... 715/838 |
| 6,392,658 | B1 | * | 5/2002 | Oura ..................... 345/629 |
| 6,563,529 | B1 | * | 5/2003 | Jongerius ................ 348/36 |
| 6,839,880 | B1 | * | 1/2005 | Morse et al. ............ 715/513 |
| 2002/0075295 | A1 | * | 6/2002 | Stentz et al. ............ 345/727 |
| 2002/0103722 | A1 | * | 8/2002 | Brown ................... 705/27 |

OTHER PUBLICATIONS

Chen et al., "View Interpolation for Image Synthesis", Apple Computer, Inc., pp. 1-7, Aug. 1993.
Aliaga et al., "Plenoptic Stitching: A Scalable Method for Reconstructing 3D Interactive Walkthroughs", Lucent Technologies Bell Laboratories, pp. 443-450; 2001.
Gortler et al., "The Lumigraph", Microsoft Research, 1996.
Nicolescu et al., "Electronic Pan-Tilt-Zoom: A Solution for Intelligent Room Systems", IEEE, Aug. 2000.
Lippman, "Movie-Maps: An Application of the Optical Videodisc to Computer Graphics", Architecture Machine Group, Massachusetts Institute of Technology, Cambridge, MA 02139, Jul. 1980, ACM.
Nayar, "Catadioptric Omnidirectional Camera", Department of Computer Science, Columbia University, New York, New York 10027, Jun. 1997.
Levoy et al., "Light Field Rendering", Computer Science Department, Stanford University, 1996.
Beauchemin et al., "The Computation of Optical Flow", Dept. of Computer Science, University of Western Ontario, ACM Computing Surveys, vol. 27, No. 3, pp. 433-467, 1995.

(Continued)

*Primary Examiner*—Kieu D. Vu
(74) *Attorney, Agent, or Firm*—Sughrue Mion, PLLC; Joseph Bach, Esq.

(57) ABSTRACT

Systems and methods generate a video for virtual reality wherein the video is both panoramic and spatially indexed. In embodiments, a video system includes a controller, a database including spatial data, and a user interface in which a video is rendered in response to a specified action. The video includes a plurality of images retrieved from the database. Each of the images is panoramic and spatially indexed in accordance with a predetermined position along a virtual path in a virtual environment.

34 Claims, 8 Drawing Sheets

OTHER PUBLICATIONS

Chen et al., "View Interpolation for Image Synthesis", Apple Computer, Inc., pp. 1-7, Aug. 1993.
Aliaga et al., "Plenoptic Stitching: A Scalable Method for Reconstructing 3D Interactive Walkthroughs", Lucent Technologies Bell Laboratories, pp. 443-450.
Kimber et al., "FlyAbout: Spatially Indexed Panoramic Video", FX Palo Alto Laboratory, Inc., Palo Alto, CA 94304 Proceedings ACM Multimedia 2001 conference, Oct. 2001.
Gortler et al., "The Lumigraph", Microsoft Research, 1996.
Nicolescu et al., "Electronic Pan-Tilt-Zoom: A Solution for Intelligent Room Systems", IEEE, Aug. 2000.
Lippman, "Movie-Maps: An Application of the optical Videodisc to Computer Graphics", Architecture Machine Group, Massachusetts Institute of Technology, Cambridge, MA 02139, Jul. 1980, ACM.
Nayar, "Catadioptric Omnidirectional Camera", Department of Computer Science, Columbia University, New York, New York 10027, Jun. 1997.
Foote et al., "FlyCam: Practical Panoramic Video and Automatic Camera Control", FX Palo Alto Laboratory, Inc., Palo Alto, CA 94304, 2000.
Naimark, ""VBK-A Moviemap of Karlsruhe" Mediated Reality and the Consciousness of Place", *From Tomorrow's Realities* catalog, Siggraph 1991.
Kawasaki et al., "Automatic 3D City Construction System Using Omni Camera", Institute of Industrial Science, University of Tokyo, Aug. 2000.
Levoy et al., "Light Field Rendering", Computer Science Department, Stanford University, 1996.
Beauchemin et al., "The Computation of Optical Flow", Dept. of Computer Science, University of Western Ontario, ACM Computing Surveys, vol. 27, No. 3, pp. 433-467, 1995.

* cited by examiner

SYSTEMS AND METHODS FOR PROVIDING A SPATIALLY INDEXED PANORAMIC VIDEO

CROSS-REFERENCE TO RELATED APPLICATION

This application claims the benefit of U.S. Provisional Application No. 60/325,172, filed on Sep. 28, 2001.

BACKGROUND OF THE INVENTION

1. Field of Invention

This invention relates generally to systems and methods for using video for virtual reality applications, and more particularly for generating a video in response to an action requested by a user to perform virtual movement along a virtual path in a virtual environment and such that the video is both panoramic and spatially indexed.

2. Description of Related Art

There have been many attempts to recreate the experience of "being in a particular place." Traditionally, this was done only through art and descriptive prose. Photography provided a great step forward in the ease and accuracy with which places could be depicted. Motion pictures and video recording provided another important improvement. These conventional mediums provide a user with a view of the space selected by a photographer in advance.

Ideally, reconstructing the experience of "being in a particular place" would allow the user to freely move around, and choose where to look. Conventionally, one approach requires a computer model of the space, and real time view rendering as a user virtually navigates through the space. Another recent approach is to record enough images to approximate the flow of light in any direction and through any point in the space, such as by representing structures using "light fields" or "lumigraphs" over a four dimensional domain.

Two conventional image-based approaches have been previously developed in an attempt to provide the feeling of being in a particular place. One approach is panoramic imagery, which allows a user to freely choose which direction to gaze from a fixed point of view. The panoramas may be recorded digitally, or may use film-based images which are scanned at high-resolution during post-processing. The panoramic images or video may be delivered over the Internet using a streaming system. Another approach is the association of video with paths that a user may follow, or images with points along those paths.

SUMMARY OF THE INVENTION

This invention has been made to overcome the shortcomings of conventional approaches to recreating the experience of "being in a particular place." For example, neither still nor motion pictures are inherently interactive forms of media. They provide the user with some views of the space, but only those chosen by the photographer in advance. The end user has little or no control over what he will see. Even when video is panned through different views from a given point, or is taken in motion along some path, the user's experience is one of "going along for the ride," but not of choosing where to go or where to look on that ride.

The conventional image-based approaches described above only partially address the problem. None of these applications use spatially indexed panoramic video. Instead, conventional image-based systems are time-based video. No conventional spatial indexing system is known that is able to provide full panoramic images presented in a continuous fashion.

This invention addresses the long-standing problems discussed above by providing systems and methods that generate a video system that produces a video that is both panoramic and spatially indexed. According to various embodiments of the systems and methods of this invention, a virtual path in a virtual environment is based on real-world coordinate positions.

Various embodiments of the systems and methods of this invention respond to a requested action from a user by generating a video that is both panoramic and spatially indexed such that a user can independently navigate along virtual paths, pan independently in various directions and/or maintain gaze on particular objects while moving along a chosen virtual path. When replayed, the video may give the user the experience of moving along virtual paths in a virtual environment. By spatially indexing the video, a user interface can be provided which allows the user to navigate along paths, such as driving along roads. At junctions or intersection points of paths, the user can choose a virtual path to follow as well as a direction to look, allowing interaction not available with conventional video. Combining the spatial index with a spatial database of maps and/or objects allows the user to navigate to specific locations or inspect particular objects in an interactive manner.

In various exemplary embodiments according to this invention, a video system is provided for virtual reality. In various embodiments, a video system comprises: a database including spatial data and a user interface having an image display in which a video is rendered in response to a specified action. The video includes a plurality of images retrieved from the database. Each of the images is panoramic and spatially indexed in accordance with a predetermined position along a virtual path in a virtual environment. In such embodiments, the user interface further may include a map display that is associated with the video, a text display illustrating spatial data that is associated with the video and/or an audio output that conveys audio data associated with the video.

In various exemplary embodiments according to this invention, the video system is implemented as a stand alone system. Alternatively, the video system can be located on a server and the user interface can be implemented as a client display program, such as for example a web browser.

In various exemplary embodiments according to this invention, spatial data corresponds to at least one of a panoramic image, a map, text, an audio output and a hypertext link. The spatial data may be any known type of data or hereafter developed data that is suitable for spatial indexing.

In various embodiments of this video system, the specified action may correspond to a request for virtual movement. For example, the virtual movement may be at least one of a direction of travel, stopping, defining a speed, snapping on an object to view, dragging a position icon, initiating a tour and panning. The specified action may be any known type of action or hereafter developed action that is suitable for spatial indexing in accordance with this invention. In such embodiments, the specified action may be selected by at least one selection device comprising at least one of a keyboard, a mouse, a knob, a joystick, a head tracking device, a floating arrow, floating text, a pedal and a hypertext link. The specified action may be selected by any known selection device or mode for specifying actions or hereafter developed selection device that is suitable for specifying an action in accordance with this invention.

According to various embodiments of this invention, a method for generating a video is provided for virtual reality. In various embodiments, the method comprises: specifying an action and generating a video along a virtual path in a virtual environment based on the specified action, wherein the video is both panoramic and spatially indexed in accordance with a position along the virtual path, and providing a user interface that displays the video via the user interface.

This invention further contemplates the use of a transport protocol to transmit a control program usable for providing a video for virtual reality for carrying out the various methods of this invention.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF PREFERRED EMBODIMENTS

A system which uses spatially indexed panoramic video for virtual reality is disclosed in "FlyAbout: Spatially Indexed panoramic Video," Don Kimber et al., ACM Multimedia conference, Sep. 30, 2001, the entire disclosure of which is incorporated herein by reference. According to this system, panoramic video is captured by a moving a 360° camera along continuous paths, and replayed to give users the experience of moving along those trajectories, and the ability to interactively view any interesting object or direction.

In accordance with various embodiments of this invention, a spatially indexed panoramic video system is provided for interactive navigation along a virtual path in a photorealistic space or virtual environment. Virtual movement by the user in the virtual environment causes the spatially indexed panoramic video system to generate a spatially indexed panoramic video for display. The spatially indexed panoramic video system offers immersive, interactive navigation of a virtual environment without the expense of generating and rendering virtual reality models. The spatially indexed panoramic video differs from conventional video in that it is both panoramic (allowing a user to look in any direction) and spatially indexed so that the video playback is controlled by virtual motion of the user.

The spatially indexed panoramic video system may be based on recorded panoramic video, acquired from a panoramic or wide-field camera of any design. Current panoramic camera designs include those based on wide-angle lenses, mirrors or multiple cameras. Since the panoramic images can be recorded by a number of different types of cameras that are well known, a description of the various types of cameras will not be discussed further.

Figure 1:
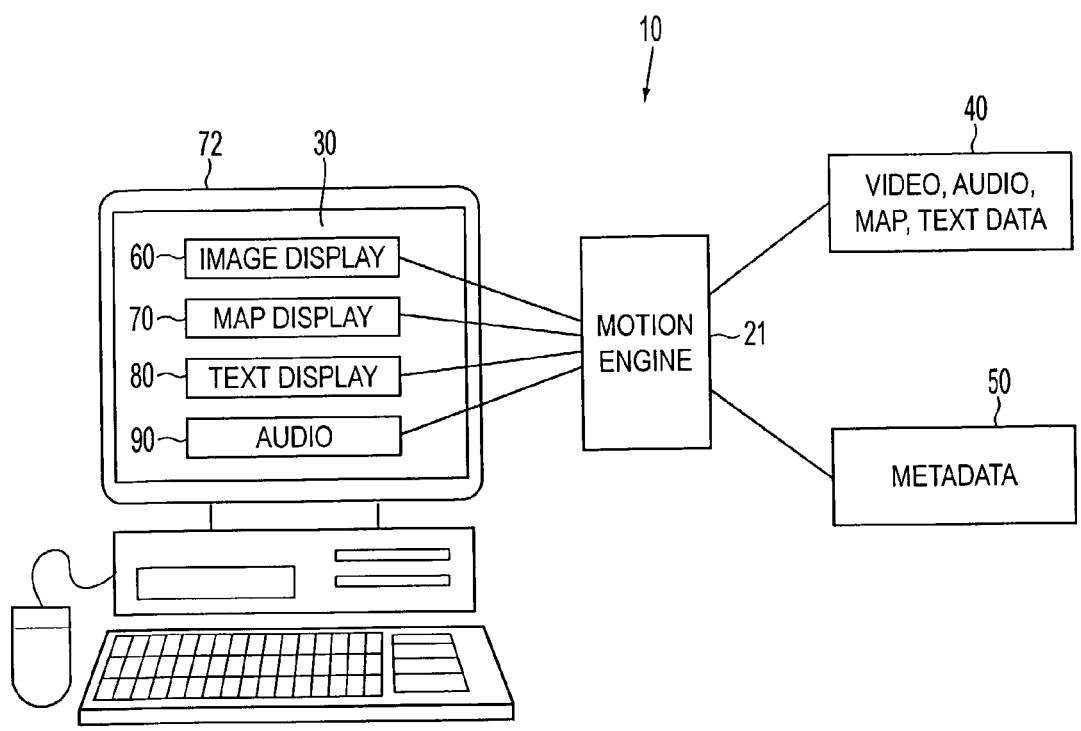
FIG. 1 illustrates a schematic view of a first embodiment of a spatially indexed panoramic video system in accordance with the present invention.

FIG. 1 is a schematic representation of a first exemplary embodiment of a spatially indexed panoramic video system 10. The spatially indexed panoramic video system 10 includes a motion engine 21, a user interface 30, a database 40 for storing spatial data and a metadata database 50 for storing various types of metadata. The user interface 30 includes an image display 60 in a display device 72 in which the spatially indexed panoramic video 65 can be viewed. Optionally, a map display 70 and a text display 80 can be provided in the user interface 30. Audio can also be provided as part of the spatially indexed panoramic video system 10. The image display 60, the map display 70 and the text display 80 can be embodied as viewers running software applications for displaying the spatial data or metadata.

In the first exemplary embodiment, the basic structure of the spatially indexed panoramic video system 10 is implemented as one program in a single address space. For example, the content of the spatially indexed panoramic video system 10 is stored on a local hard drive, such as, for example, where software of the spatially indexed panoramic video system 10 is stored on DVD.

Figure 2:
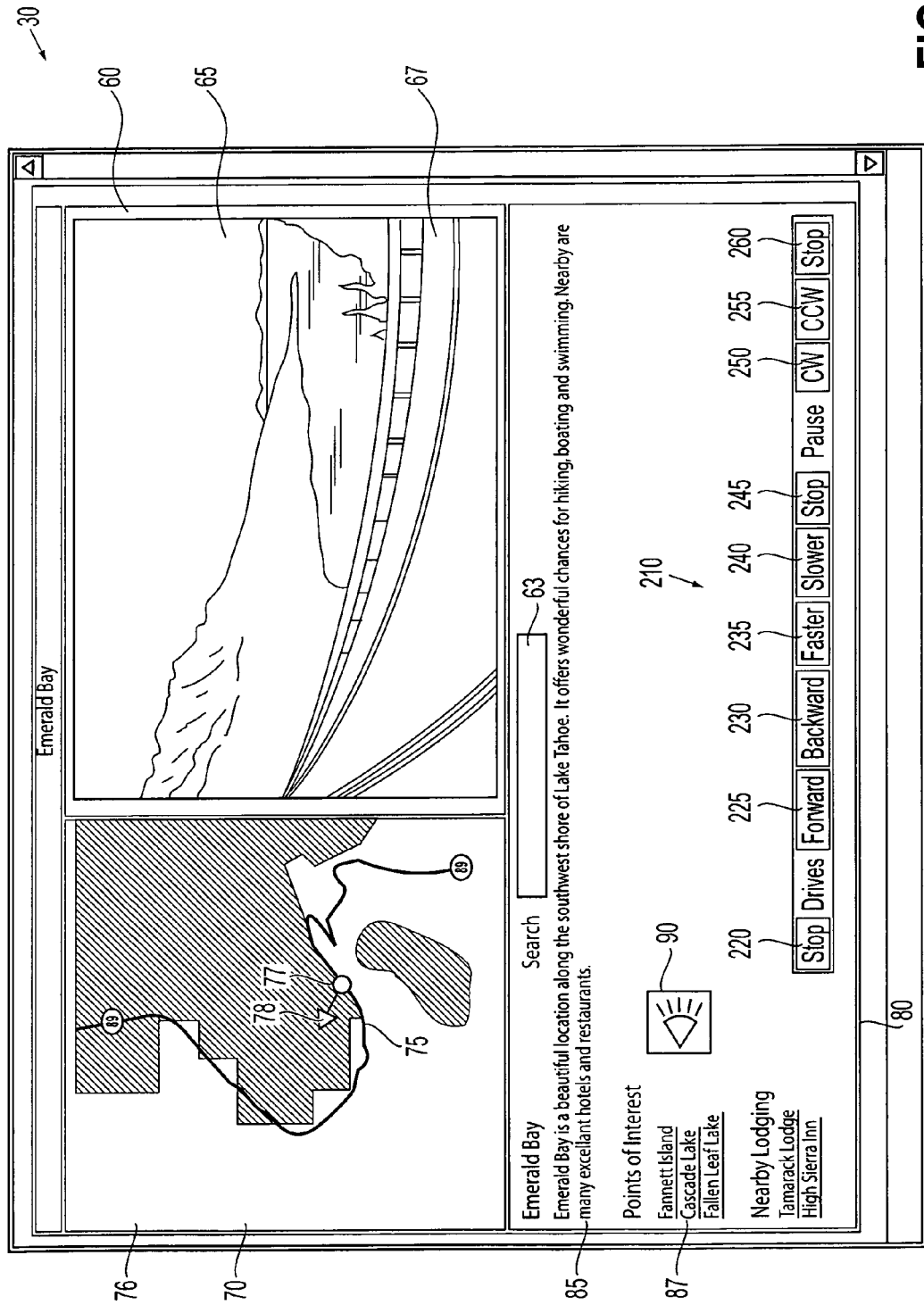
FIG. 2 illustrates a user interface of the spatially indexed panoramic video system in accordance with the first embodiment of the present invention.

FIG. 2 illustrates the user interface 30 in accordance with the first embodiment of the invention. The user interface 30 includes the image display 60, the map display 70, the text display 80 and an audio indicator 90. The content of the spatially indexed panoramic video system 10 can be presented as an integrated multimedia form including, for example, a video, a map, text, audio and any other data that can be spatially indexed.

The image display 60 displays the spatially indexed panoramic video 65. The spatially indexed panoramic video 65 is generated in response to an action, or virtual movement, specified by a user of the system 10. The spatially indexed panoramic video 65 comprises a plurality of images 67 that have been spatially indexed. The images 67 are stored in the database 40. The images 67 are panoramic and spatially indexed in accordance with a predetermined position along a virtual path 75 in a virtual environment 76. The spatially indexed panoramic video 65 may be displayed in accordance with any number of methods. One method is through a window, for example, as illustrated in FIG. 2. The image display 60 shows an image 67 that the user would see if he was actually present.

The user interface 30 also includes the map display 70 that displays spatial data associated with the image display 60, for example, a two-dimensional or map-like representation of a continuous virtual path 75 in the virtual environment 76. The map display 70 can also provide a position icon 77 with a gaze direction indicator 78 in the direction of the current view in the virtual environment 76. For example, in FIG. 2, the map display 70 illustrates a road map of Emerald Bay and the virtual path 75 is along "route 89." The gaze direction indicator 78 of the position icon 77 is in the northwest direction. The gaze direction corresponds to the current image 67 that the user views in the image display 60.

Further, the user interface 30 includes the text display 80. The text display 80 is associated with the current image 67 displayed in the image display 60. Various types of text can be used in accordance with the spatially indexed panoramic video system 10. For example, the displayed text can be brief, such as in the form of a heading 85 or title. The displayed text can be lengthy, such as a description about the current image 67. Alternatively, the text can be a hypertext link 87 that can provide more information from another web page if selected. The text display 80 is not limited to such forms of text, but can display any type of information that provides a description relating to the current image 67, such as for example, thumbnail images, graphics and audio.

One or more text displays can be provided to supply information to the user in any one of the displays. As the viewpoint of the spatially indexed panoramic video 65 moves in the virtual environment 76, the text display 80 is updated to provide additional, more relevant, text corresponding to objects that the user is viewing. On the other hand, hypertext links 87 in a text display 80 can also be used to change the position or gaze direction in the virtual environment 76. For example, a list of selectable icons representing hotels or restaurants can be displayed, and clicking on one of the icons could change the user's position on the virtual path 75 to another position on the virtual path 75 near the hotel or restaurant selected. Various icons can be provided for numerous objects, including on a virtual tour along a virtual path 75 to, or around, an object of interest.

A particular advantage of the spatially indexed panoramic video system 10 is the ease with which hypertext links 87 can be added to the spatially indexed panoramic video 65. Because the viewpoint and position are typically known, the range and angle to any object in a spatial database can be determined and a hypertext link 87 can be used to automatically annotate the spatially indexed panoramic video system 10. For example, a hypertext link 87 can be displayed when the spatial location of the user in the virtual environment 76 is within a certain range of a particular object of interest. Alternatively or additionally, a text overlay can be placed at the proper angle in the spatially indexed panoramic video 65. Thus, when passing an object, such as a building or a mountain, the name of the object may be displayed as an overlay on, or adjacent to, the object without additional video analysis or processing.

An audio output can also be provided to correspond to the current images 67 and/or objects in the spatially indexed panoramic video system 10. For example, in FIG. 2, the scenic view displayed in the image display 60 can be described by an audio output that corresponds to the spatial location of the current image 67 in the spatially indexed panoramic video 65. Also, when a user desires to interactively map directions from one location to another, for example, with direction mapping software, audio can be provided to direct a user with audible instructions, such as by directing the user to "turn right," "turn left," "go forward for one mile," and the like. Furthermore, if a particular object of interest appears at a particular spatial location in the spatially indexed panoramic video 65, an audio output can be provided that audibly describes the object. The use of an audio transmission can be implemented in a variety of situations and is not limited by the examples described above.

Additionally or alternatively, the user interface 30 can include the audio indicator 90. By selecting the audio indicator 90, any type of audio narration can be provided that is helpful to an understanding of the current image 67 displayed in the spatially indexed panoramic video 65. The audio data transmitted from the audio indicator 90 can include a description of an object, narration, music, or any other type of audio representation that can be triggered by specified locations in the spatially indexed panoramic video 65.

According to various embodiments of the invention, the audio presentation can be implemented in a variety of ways. For example, as a "play once" type of a narration, and a "looped" audio representation. Such examples may include environmental sounds (for example, traffic, a waterfall, a birdsong) that are associated with particular locations or ranges of locations, and that play continuously when the user is at that location, or in that region. Moving away from a location can cause the associated audio to fade proportionally, such as for example, proportional to the inverse square of the distance as it would in the real world. In a location near more than one sound location, the user can hear a mix of the location sounds proportional to the inverse square of the respective distances. In addition, audio spatialization techniques can be used to make a particular audio source appear to originate from a particular direction, so the apparent audio source direction can be rotated as the user rotates the view to increase the verisimilitude. For example, if the user rotates his/her view so a waterfall appears first on the left then on the right, the audio associated with that waterfall can be spatialized from left to right.

Referring again to FIG. 1, two types of databases are provided in the spatially indexed panoramic video system 10. The database 40 stores spatial data and the metadata database 50 stores metadata. The spatial data can include, but is not limited to, panoramic images, video, text, maps, graphical representations and any other type of data that can be spatially indexed. The spatial data is indexed by location, not by time, as done conventionally. Some examples of spatial data indexed by location, includes but is not limited to, Global Positioning Satellite (GPS) location data defined by latitude, longitude, and elevation, x-y-z spatial coordinates, a row or aisle in a warehouse, street addresses, room numbers in a building and any other known or later developed data capable of being indexed by location.

Although the database 40 and the metadata database 50 are shown as separate elements, combining the spatial data in the database 40 and the metadata in the metadata database 50 into a single database is also contemplated by this invention.

Figure 4:
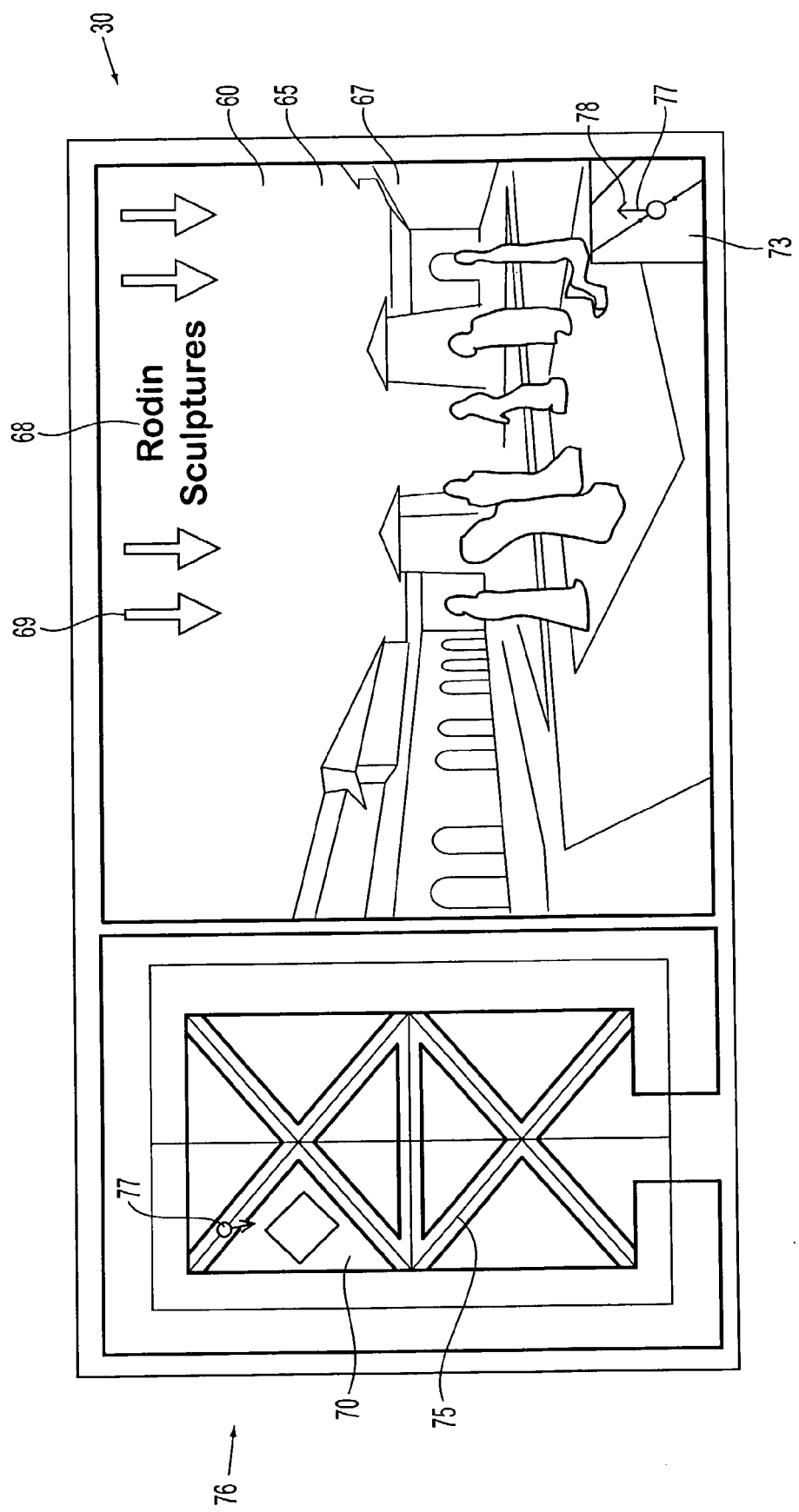
FIG. 4 illustrates another user interface of the spatially indexed panoramic video system in accordance with the first embodiment of the present invention.

Metadata is used to describe the spatial location of the camera, or the current image 67 shown on the image display 60, for example, in an x, y, z coordinate system in the virtual environment 76 at any given moment. There are at least two categories of metadata related to the spatially indexed panoramic video system 10. One category relates to captions 68, for example, as shown in FIG. 4. The caption 68 entitled "Rodin Sculptures" is metadata. Captions 68 are associated with objects in which a user might have a particular interest. Captions 68 help a user navigate through the virtual environment 76 by displaying the captions on the user interface 30. The captions 68 can take various forms including, but not limited to, relevant text or hypertext links displayed adjacent to, or on, objects of interest to the user.

Metadata can also be retrieved from existing maps, aerial photographs, spatial databases or other available images, such as a building floor plan. Using GPS data or similarly accurate spatial data, a simple map of the camera paths can be rendered directly from the data. According to various embodiments of the invention, spatial location data is stored as GPS latitude/longitude pairs.

The second category of metadata stored in the metadata database 50 is data tuples. For example, the camera paths are conveniently represented as data tuples of the form (x,y,a,t) where x and y are the location of the camera, a is the orientation angle of the camera, and t is the time. A data tuple could be given for every image of the spatially indexed panoramic video 65. However, assuming the camera motion is relatively smooth, a much smaller number of tuples can be provided, and linear interpolation can be used to estimate camera position and orientation at intermediate points.

Spatial sensors, such as a Global Positioning Satellite (GPS) unit, may be used to produce the spatial metadata automatically. Various other sources for determining spatial metadata include, but are not limited to, radio beacons or dead reckoning from vehicle speed and heading or acceleration. Alternatively, spatial metadata may be produced by image processing of the panoramic images, for example, by using triangulation from known points to determine a camera position. Further, it is contemplated by this invention to produce the spatial metadata manually using a map, known paths, and landmarks visible in the spatially indexed panorama video 65.

The spatially indexed panoramic video system 10 stores panoramic images indexed by space, rather than time. Conventionally, video images are ordered by time and motion corresponding to an increase in time. However, under the control of the motion engine 21, current images 67 are ordered in response to an action specified by a user requesting virtual movement along a virtual path 75 in the virtual environment 76.

Figure 3:
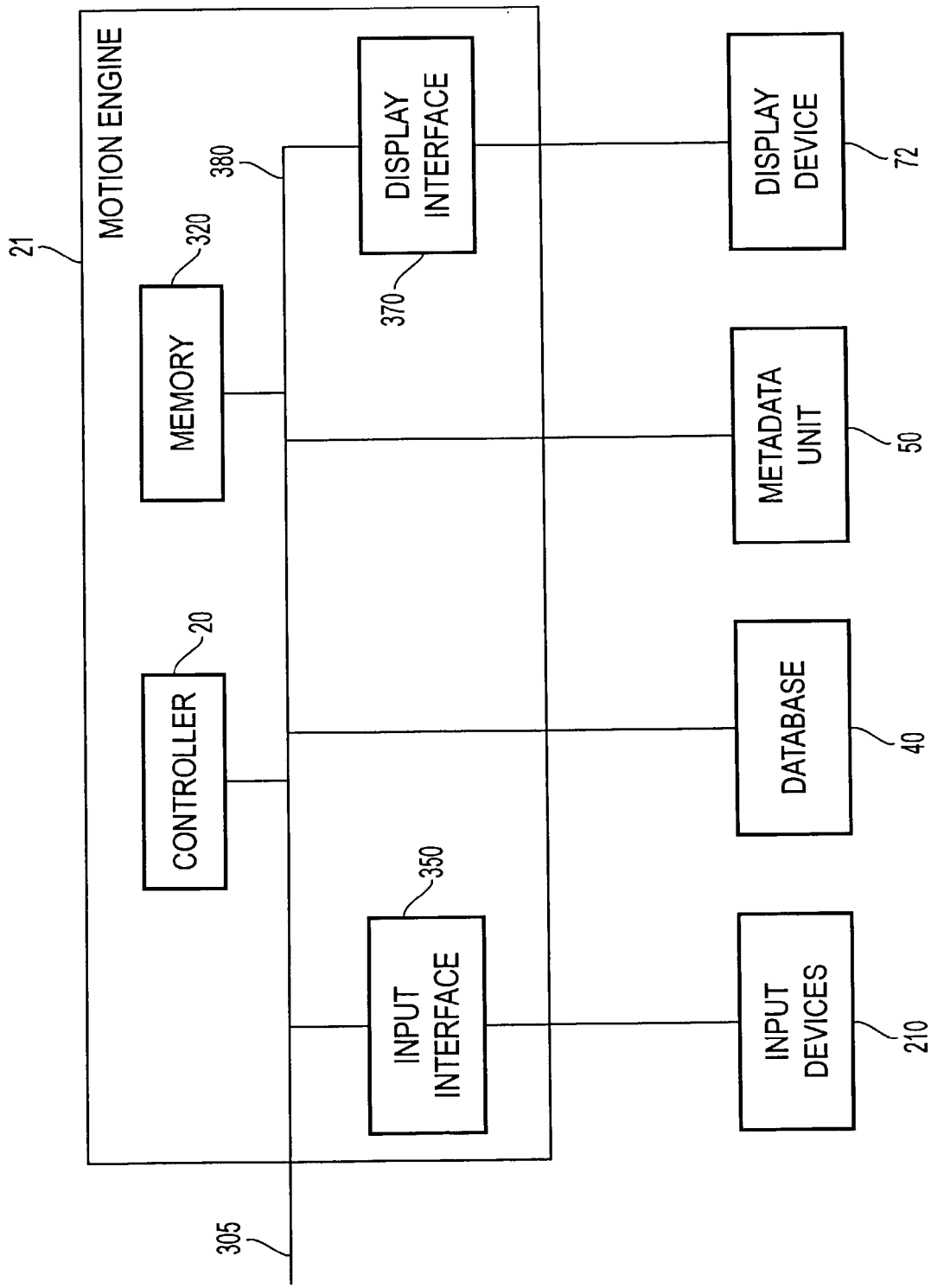
FIG. 3 illustrates a schematic view of a motion engine of the spatially indexed panoramic video system in accordance with the first embodiment of the present invention.

FIG. 3 is a schematic diagram of the motion engine 21 in accordance with the spatially indexed panoramic video system 10. The motion engine 21 may be implemented using a programmed general-purpose computer. The programmed general purpose computer may be programmed to process actions specified by a user to generate a spatially indexed panoramic video 65 as the user moves along a virtual path 75 in a virtual environment 76.

As shown in FIG. 3, the motion engine 21 includes a controller 20, memory 320, an input interface 350, at least one input device 210, a display interface 370 and a display device 72 interconnected by a common bus 380. The motion engine 21 is connected to the database 40 and the metadata database 50 for receiving spatial data and metadata, respectively.

The memory 320 can be any alterable random access memory, including static RAM, dynamic RAM or flash memory. The memory 320 is used to store system variables and data being used by one or more of the programs executed by the controller 20. The memory 320 can be any non-volatile memory, such as a floppy disk and disk drive, a writable optical disk and disk drive, a hard drive, flash memory, a remotely stored memory, e.g. on a server that is being accessible by a communication link 305, such as the Internet, or the like. The memory 320 can store any data not presently being used by any of the programs executed by the controller 20, such as spatial data that is used to generate the spatially indexed panoramic video system 10 software application.

The input interface 350 connects the input devices 210 to the motion engine 21. A user may enter an action by at least one of the input devices 210. In general, the input devices 210 can include any device or mode capable of causing a selection in accordance with the spatially indexed panoramic video system 10. For example, the input devices 210 can include, but are not limited to an icon, a mouse, a trackball, a touch pad, a keyboard, a pen-based device, dragging and clicking a cursor, selecting an object or the like. The input device can also include, joysticks, game controllers (for example a steering wheel, an accelerator/brake pedal) and other controllers specialized for driving games and/or other applications. The input interface 350 can also be used to connect two or more of these input devices 210 to the motion engine 21, such as a mouse and a keyboard. Accordingly, the input interface 350 can be one physical device or two or more separate devices.

The display interface 370 connects the display device 72 to the controller 20 of the motion engine 21 and can be any known device, such as a video card or the like or any hereafter developed device that is capable of communicating data from a display device to a controller. The display interface 370 typically contains its own memory, and is used to generate and supply the display drive signals to the display device 72 from the display signals generated by the controller 20.

The motion engine 21 is also provided with a communication link 305 for applications such as where a carrier wave signal is communicated during a server push and to access remote servers. In the alternative, the communication link 305 of the motion engine 21 may be applied such as where a carrier wave signal is communicated in response to the spatially indexed panoramic video system 10 being implemented as a client-pull system.

According to various embodiments of this invention, the spatially indexed panoramic video 65 is generated in response to an action specified from a user requesting virtual movement. Various actions can be specified by the user. Referring again to FIG. 2, an action can be requested by various methods, including, but not limited to, using input devices 210, such as a mouse, a keypad, a button, an icon on the user interface 30, a table, a drop down table, a knob, voice activation, or any other method for specifying an action.

In accordance with this embodiment, the user interface 30 is provided with input devices 210 for generating an action to perform virtual movement in the virtual environment 76 along a virtual path 275. Various virtual movement requests can be performed on the spatially indexed panoramic video 65 as shown by the input devices 210, including, but not limited to, stop 220, drive forward 225, drive backward 230, drive faster 235, drive slower 240 and stop driving 245. Further, additional input devices 210 can be provided for panning the images horizontally or vertically, including but not limited to, panning clock-wise (CW) 250, panning counter-clock-wise (CCW) 255 and stop panning 260. Additional actions can include commands, for example, setting a speed, setting a position of the video, moving to a particular position, getting a current position, setting a gaze direction, setting a field of view or any other action suitable for specifying virtual movement in the spatially indexed panoramic video system 10.

For example, when the spatially indexed panoramic video system 10 is used to control the speed, or position of the video, a speed of 1 can represent that the video is played at normal speed. Other speeds may be used to provide multiples of real-time, including fast-forward, slow motion, or even reverse at a selectable speed. The user interface 30 can also permit change in the view direction and degree of zoom.

In operation of the exemplary embodiment, the motion engine 21 correlates panoramic images, maps, text and audio stored in a database 40 with metadata stored in a metadata database 50 to render the spatially indexed panoramic video 65 in the image display 60, a map in the map display 70, text in the text display 80 and the audio output to the user interface 30 based on an action chosen by the user of the spatially indexed panoramic video system 10. The specified action defines a virtual movement that the user desires to make along a virtual path 75 in the virtual environment 76 of the spatially indexed panoramic video system 10. Based on the action chosen by the user, a request is generated to retrieve a plurality of images from the database 40 and corresponding metadata from the metadata database 50 to generate the spatially indexed panoramic video 65. After the request has been processed and the images have been retrieved and processed by the controller 20 in the motion engine 21, the spatially indexed panoramic video 65 is rendered in the image display 60 on the user interface 30.

For example, if an action is specified, such as, to drive "forward" by selecting at least one of the input devices 210 along the virtual path 75 at a given speed, the motion engine 21 specifies parameters to control virtual navigation. Various other features can also be controlled by the motion engine 21. For example, the motion engine 21 can indicate a preferred direction, and decide what direction to travel when an intersection is reached in the virtual environment 76. The motion engine 21 may impose a "default rule," that is, motion will proceed in the direction closest to the preferred direction. The motion engine 21 can also specify a mode, or direction in which the preferred direction is updated to match the "forward" direction along the virtual path 75. This motion will always be as "straight as possible" and when an intersection is reached, the direction chosen will be the direction as close as possible to the direction of the virtual path 75 which was traveled before approaching the intersection.

FIG. 4 illustrates another exemplary user interface 30 in which like reference numbers correspond to similar elements in FIG. 3. The user interface 30 includes an image display 60 and a map display 70. The image display 60 displays the spatially indexed panoramic video 65. The spatially indexed panoramic video 65 comprises a plurality of images 67 retrieved from the database 40. Each of the images 67 is panoramic and spatially indexed in accordance with a predetermined position along a virtual path 75 in a virtual environment 76.

In various exemplary embodiments of this invention, a position icon 77 is provided that has a gaze direction indicator 78 for specifying the gaze direction as shown by the current image 67. In FIGS. 3 and 4, the position icon 77 is shown as a floating arrow. The position icon 77 can be controlled by various modes, for example, a knob, a horizontal motion of the mouse, depressing keys to change the preferred direction from left to right, visa-versa, or by rotating the position icon 77, for example, by clicking and rotating the position icon from left to right to change the gaze direction or any other method for controlling movement.

Navigation through the virtual environment 76 can be based on the gaze direction as the preferred direction when an intersection is encountered along a virtual path 75 in the virtual environment 76. Another navigation mode uses the current direction of motion as the preferred direction. In this case, when an intersection of the virtual path 75 in the virtual environment 76 is reached, the spatially indexed panoramic video system 10 can be designed to head in a direction as "straight as possible." This is useful when the spatially indexed panoramic video system 10 is implemented as a "hands off" tour in which the motion proceeds continuously along a virtual path 75. Alternatively, intersection choices can be prerecorded at every intersection in the spatially indexed panoramic video system 10, or a preferred direction set at any point, for example, to minimize the tour length or to ensure that users view a particular segment of a virtual path 75.

In addition to controlling the gaze direction with, for example, a position icon 77 and/or buttons 250, 225, 260, a user can also control motion with other input devices 210. On any given virtual path 75 in the virtual environment 76, the user may move in either of two directions and may control the speed of the motion, using at least one input device 210, such as a mouse, joystick, buttons 220, 235, 240, 245 or pedals. When motion along a virtual path 75 brings the viewpoint position to an intersection where several virtual paths 75 join, users may indicate which of the several virtual paths 75 they will take. A variety of exemplary interfaces are possible for selecting motion, such as "left, right and straight" buttons that are activated when there is a choice of direction.

The user may also control the preferred direction of motion independently of the gaze direction, for example, with buttons 225, 230. Thus, the spatially indexed panoramic video system 10 may permit a user to specify an object, or location to look at, rather than a specific direction. In FIG. 4, for example, a user can snap onto the "Rodin Sculptures" 68 to designate the "Rodin Sculptures" 68 as the selected object that the user desires to view. As the user moves around various virtual paths 75 in the virtual environment 76, the user's gaze remains fixed on the selected object. This makes it easy to view an object from any position. Conventional "object movies", which provide views of a single object from multiple directions, do not permit one to look in directions other than at the object, as with the spatially indexed panoramic video system 10. Additionally, it is desirable to provide path segments 73 that can be displayed in the display image 60 for navigating around more than one object. For example, this is particularly useful for e-commerce, such as in a car sales lot. If cars are arranged in a grid, then capturing the spatially indexed panoramic video 65 along all grid borders then lets the spatially indexed panoramic video system 10 automatically generate a view of any car from any angle.

According to various embodiments of this invention, the user may be provided with visual cues that make a user aware of available navigable choices or modes along the virtual path 75 in the virtual environment 76.

A useful function is to allow the user to request a specific direction to gaze and a specific direction to travel. In many cases, this may be obvious from the viewpoint. For example, if the content is collected along a virtual road or an obvious virtual path 75, then it should be clear to the user where it is possible to turn onto an alternate virtual path 75 or whether the user is constrained to a single virtual path 75. However, it is not obvious what virtual paths 75 are available in the absence of visual cues. Also, for spatially indexed panoramic video footage collected along a road or driveway in the virtual environment 76, some turnoffs or driveways may not be accessible. In these situations, the user may evaluate his choices by consulting the map display 70, for example, as shown in FIG. 4. However consulting a map may be burdensome, and a distraction from the immersive experience. In this situation, visual cues, such as floating arrows 69 can alert the user of a navigable choice. Alternatively, a small path segment 73 of the map display 70 may be shown in the image display 60, oriented with respect to the user's current gaze direction, and perhaps with a gaze direction indicator 78 to simulate the user's view. FIG. 4 illustrates this feature in the bottom right corner of the image display 60.

Color may also be used to enhance the user interface 30. For example, the virtual path 75 in the virtual environment 76 may be colored to identify the virtual path 75 from the virtual environment 76. Further, any object in the user interface 30 may be colored to assist the user in understanding the virtual environment 76 of the spatially indexed panoramic video system 10.

A "take-me-there tour" is another exemplary use for navigation in the spatially indexed panoramic video system 10. In the "take-me-there tour," the system 10 automatically generates a tour to a destination specified by an action of the user. For example, a use may enter a beginning and final destination and the "take-me-there tour" will navigate the user along the virtual path 75 of the virtual environment 76 from the beginning to the final destination. In the alternative, a user may enter only the final destination and proceed to the final destination from the current viewpoint displayed at the time that the request was made.

Another exemplary mode for moving from one location on a virtual path 75 in a virtual environment 76 is by utilizing a search box 63, for example, as shown in FIG. 2. A user can move from one location to another by entering a particular search query into the search box 63 to locate a final destination.

Another navigational mode that can be used in accordance with this invention is an automatically generated virtual guided tour. For example, a web-based map service may provide an alternative to maps or textual driving instructions in the form of spatially indexed panoramic video 65 showing what it is like to drive along the given route, or virtual path 75.

Figure 5A:
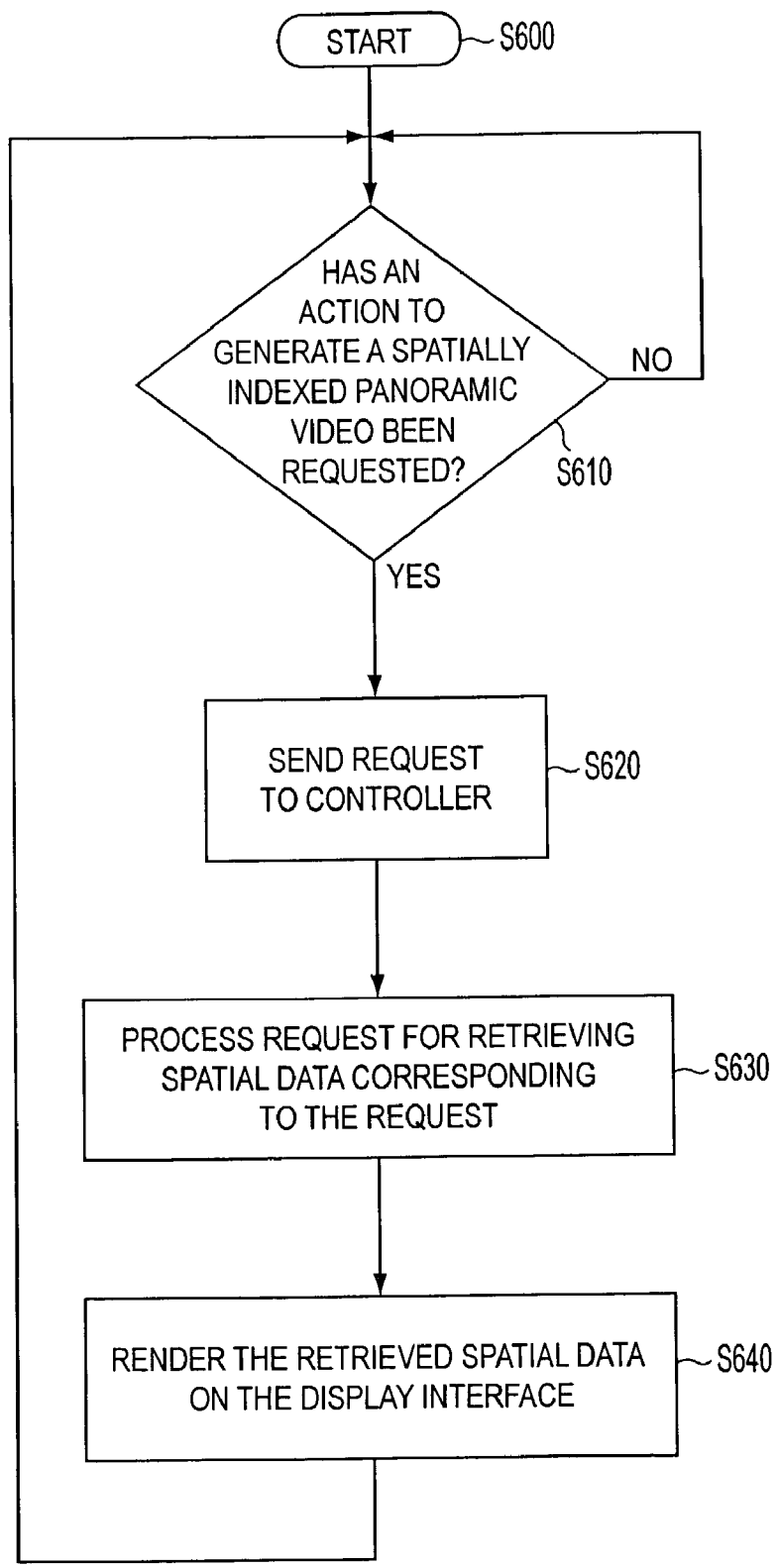
FIGS. 5A and 5B illustrates an exemplary process for the spatially indexed panoramic video system in accordance with the present invention.
Figure 5B:
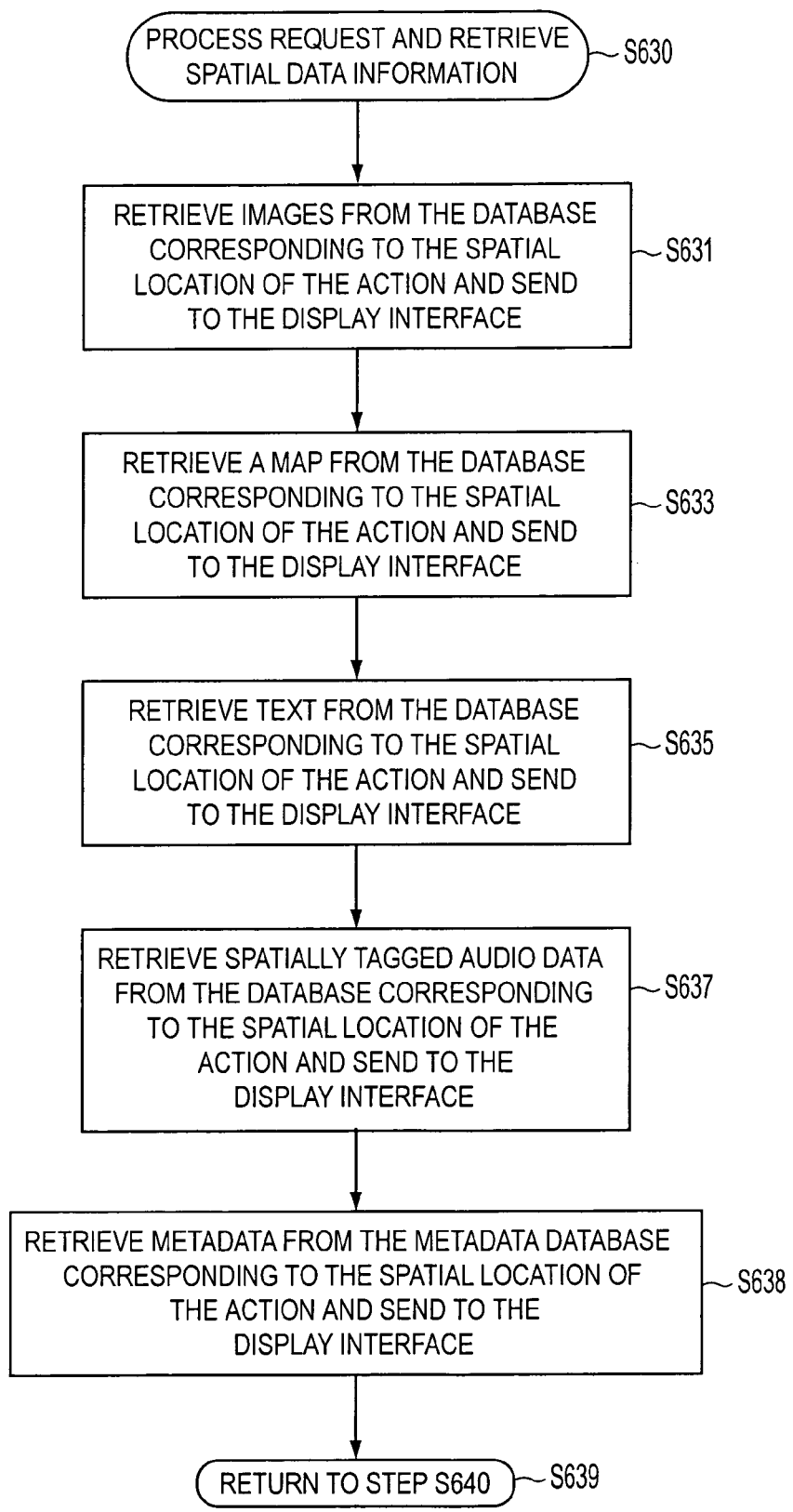

FIGS. 5A and 5B show an exemplary method for the spatially indexed panoramic video system 10.

As shown, a control routine begins at step S600. The control routine continues to step S610.

In step S610, the control routine determines whether an action to generate a spatially indexed panoramic video has been requested or specified by a user. The actions of the spatially indexed panoramic video system are based on the spatial location, or position, of the user on a virtual path in the virtual environment. If an action has been requested, then control routine continues to step S620. The action can be requested in a variety of ways including, but not limited to, with a button, an icon on the user interface, hypertext links, moving a cursor and selecting portions of the user interface, entering a search query, selecting text that has been overlaid onto various parts of the user interface, using any one of the input devices described above and any other known or later developed method of providing selection. If an action has not been requested, then the control routine returns to step S610.

In step S620, the request is sent to the controller in the motion engine.

In step S630, the request is processed and spatial data corresponding to the request to generate a spatially indexed panoramic video is retrieved from the database and the metadata database, respectively. FIG. 5B outlines in greater detail this aspect of the processing the request, and will be described later. The control routine then continues to step S640.

In step S640, the spatial data corresponding to the request to generate a spatially indexed panoramic video by the controller is compiled and rendered on the user interface.

The control routine then returns to step S610 to determine if another action has been generated by the user.

FIG. 5B shows the process of requesting spatial data from the database that corresponds to the request to generate a spatially indexed panoramic video. As shown, beginning in step S620, the control routine continues to step S621.

In step S621, the control routine retrieves images from the database and metadata from the metadata database corresponding to the spatial location of the action and sends the spatial data to the user interface 30. The images are panoramic and are spatially indexed to correspond to a spatial location, or position, in the spatially indexed panoramic video. The images retrieved can be as few as one, for example, where a request to "Stop" driving has been requested. Alternatively, where a request to drive "Forward" at an accelerated velocity has been requested, it is contemplated that a large number of images would be requested by the controller and compiled to generate the effect of traveling at a high speed in the spatially indexed panoramic video. Additionally, as shown in FIG. 4, a current image can also contain metadata in the form of visual cues, such a floating arrow, or caption, to alert the user of the navigation choice available to the user or text that is overlaid to alert the user of a description or a further action being possible if the user selects the text. The control routine then continues to step S623.

In step S623, the control routine retrieves a map from the database corresponding to the spatial location of the action and sends the map as spatial data to the user interface 30. As shown in FIGS. 2 and 4, the map display can also contain spatial data in the form of visual cues, such as a floating arrow to alert the user of the navigation choice requested by the user. The control routine then continues to step S625.

In step S625, the control routine retrieves text from the database corresponding to the spatial location of the action and sends the text as spatial data to the user interface 30. Referring again to FIG. 2, the text can be illustrated as a heading, a description, a hypertext link, as text overlaid onto the image display or the map display or any other type of text that is helpful in allowing the user understand the current image of the spatially indexed panoramic video in the image display. The control routine then continues to step S627.

In step S627, the control routine retrieves audio from the database corresponding to the spatial location of the action and sends the audio as spatially-tagged audio data to the user interface 30. The audio can present any number of audio segments, including but not limited to, a narration about the image shown in the image display, a song, a set of directions to a desired location, such as where a user the spatially indexed panoramic video system is used in combination with direction displaying software. The control routine then continues to step S628.

In step S628, the control routine retrieves metadata from the metadata database corresponding to the spatial location of the action and sends the data to the user interface 30. The control routine then continues to step S629, where the control routine then returns to step S640.

Figure 6:
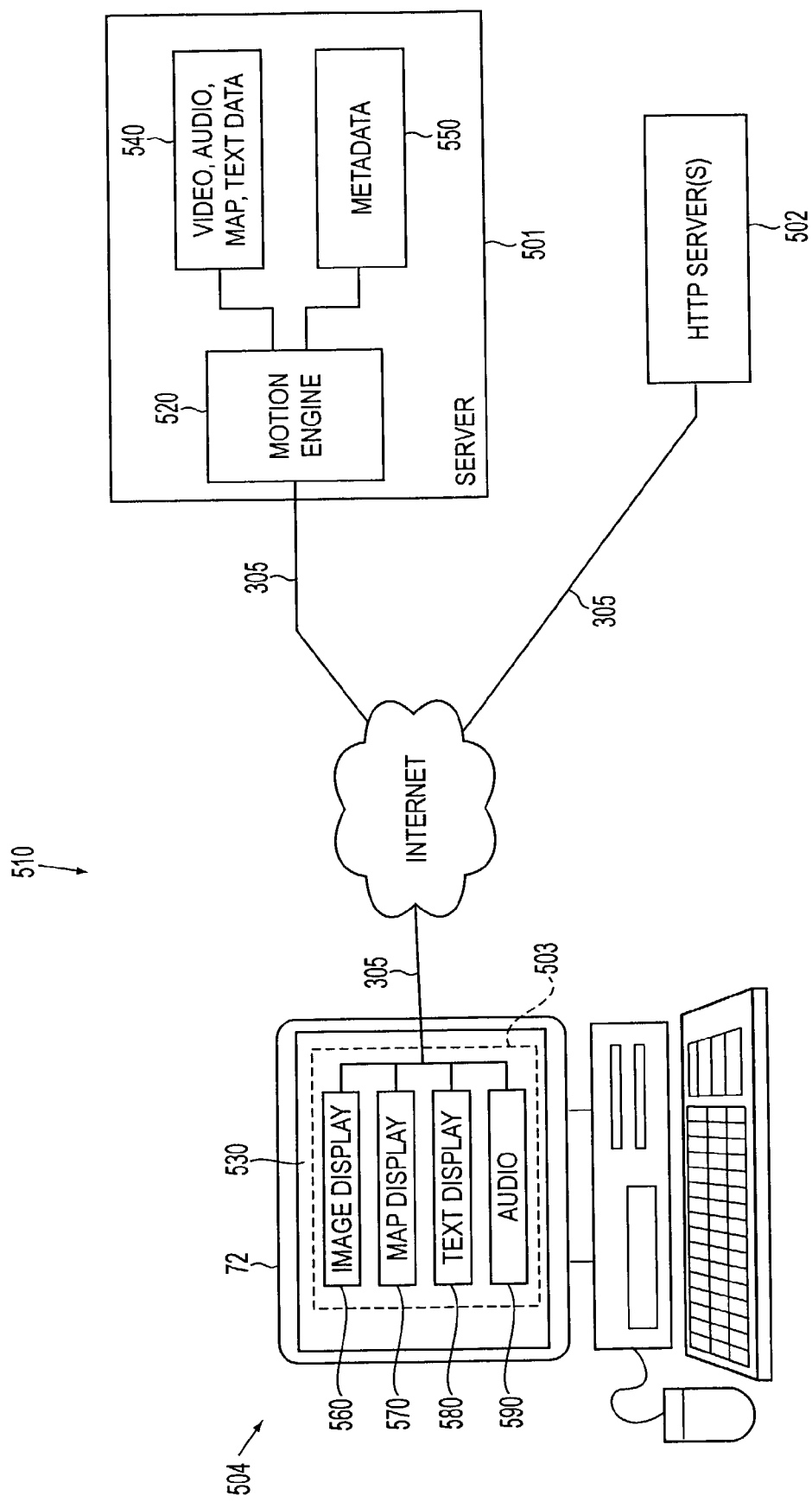
FIG. 6 illustrates a schematic view of a second embodiment of a spatially indexed panoramic video system in accordance with the present invention.

FIG. 6 illustrates a second embodiment of a spatially indexed panoramic video system 510 implemented as a network system. This spatially indexed panoramic video system 510 functionally operates similar to the spatially indexed panoramic video system 10 in the first embodiment. However, in this second embodiment, the spatially indexed panoramic video system 510 is implemented as a browser 503 and consists of images being updated by server push, or alternatively, for example, by a streaming media player.

FIG. 6 is an exemplary representation of the spatially indexed panoramic video system 510. The spatially indexed panoramic video system 510 includes the client display program 503 located on a client computer 504, connected to a server 501 and a HTTP server(s) 502 through a communication link 305, that transmits, for example, across the Internet. An image display 560, a map display 570, a text display 580, and an audio output 590 are presented in the client display program 503. An input interface 530 receives actions from the plurality of input devices 210 to produce the spatially indexed panoramic video 65. The server 501 includes a motion engine 520, a database 540 for storing spatial data and a metadata database 550 for storing metadata.

In this exemplary embodiment, the image display 560 is an HTML image that can be updated by server push via a carrier wave. In the alternative, a streaming video format may be used. However, the buffering must be kept small enough so that latency does not ruin the sense of interactivity in the display interface 530. The map display 570 is interactive and can be implemented, for example, as a Java applet. A simple HTTP based control protocol can be used to control the motion engine 520. The motion engine 520 is controlled by sending HTTP GET requests to the servers 501, 502 using special control URLs, this allows control by a Java applet, from links in an HTML page, or by any other device or system that can generate HTTP requests.

Figure 7:
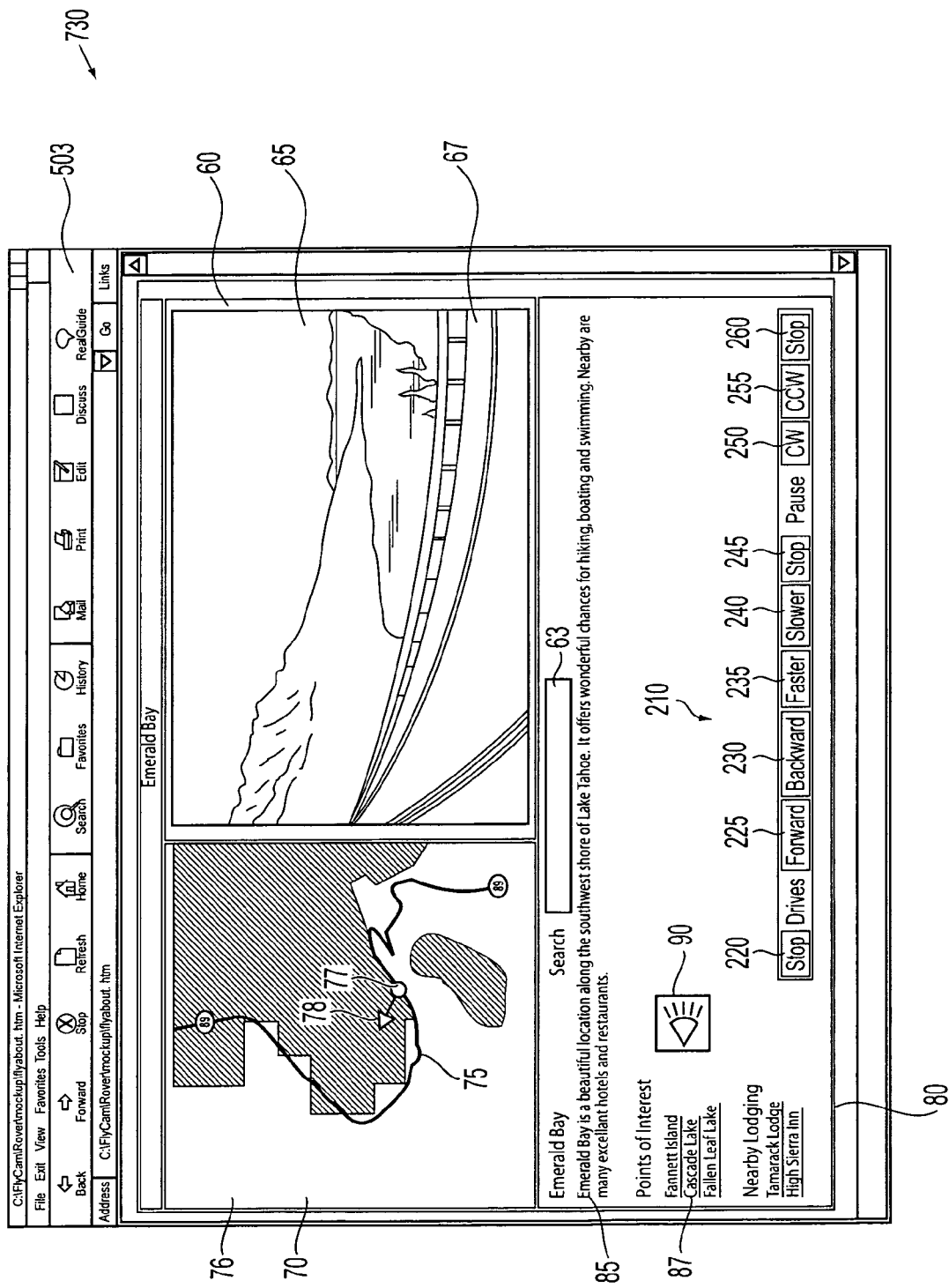
FIG. 7 illustrates a user interface of the spatially indexed panoramic video system in accordance with the second embodiment of the present invention.

FIG. 7 illustrates another exemplary user interface 730 in accordance with the second embodiment of the spatially indexed panoramic video system 510.

Various other embodiments are within the scope of this invention. For example, the spatially indexed panoramic video 65 may be presented on a television or projection display. Since the spatially indexed panoramic video 65 footage can be taken along a street or road, the metaphor of being in a car may be used, such as that shown in FIGS. 2 and 7. Alternatively, multiple physical displays could be used to present the view one would expect out different windows of a car.

A head mounted display may also be used for a more immersive experience. In such embodiments, head tracking may be sensed to determine the gaze direction so that the spatially indexed panoramic video 65 is changed in response to the user's head position.

There are a number of possible uses for the spatially indexed panoramic video systems according to this invention, for example, in real estate. Although fixed position panoramic views are conventionally used for showing homes and properties on the web, the spatially indexed panoramic video systems according to this invention allow potential buyers to not only see a home from a number of fixed positions, but also to virtually walk through the home. Further, the spatially indexed panoramic video systems according to this invention may be used for navigating through towns or neighborhoods, so that the user virtually experiences driving to the home before walking through, or around the exterior of the home.

Another use for the spatially indexed panoramic video systems according to this invention is in the travel industry. A user could virtually drive through a resort area, such as Waikiki, Hi., and determine which hotel has the most desirable location and view. This would provide users with a better sense of what it would really be like to stay at a particular location.

Additionally, the spatially indexed panoramic video systems according to this invention may be used for e-commerce by allowing users to look around virtual showrooms of products, for example, showrooms of expensive cars. By orienting the spatially indexed panoramic video systems to objects, such as cars, users can click on a particular object without having to worry about object layout or navigation.

Different levels of detail can be integrated for content of the spatially indexed panoramic video systems according to this invention. For example, a spatially indexed panoramic video of the Las Vegas strip could be produced with virtual paths along streets and sidewalks. This may be useful to users even without detailed content for specific resorts, because users would be able to move around and view establishments from the outside. The spatially indexed panoramic video systems may be linked to a hotel reservation system or other value-added services in such a way that clicking on an establishment would call up a web page or other data. Additional material would allow users to walk into particular establishments or around their grounds.

Uses for the spatially indexed panoramic video systems according to this invention are numerous and can include, but are not limited to, entertainment, education and popular attractions, such as the Grand Canyon, the Alps, or the Taj Mahal.

The systems and methods for spatially indexed panoramic video according to this invention may be implemented on a programmed general purpose computer. However, the systems and methods for spatially indexed panoramic video according to this invention can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 5A and 5B can be used to implement the systems and methods according to this invention.

The various blocks shown in FIGS. 1, 3 and 6 can be implemented as portions of a suitably programmed general-purpose computer. Alternatively, the various blocks shown in FIGS. 1, 3 and 6 can be implemented as physically distinct hardware circuits within an ASIC, or using a FPGA, a PDL, a PLA or a PAL, or using discrete logic elements or discrete circuit elements. The particular form each of the blocks shown in FIGS. 1, 3 and 6 will take is a design choice and will be obvious and predicable to those skilled in the art.

As shown in FIG. 3 the memory 320 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication link 305 as shown in FIGS. 3 and 6 can be any known or later developed device or system for connecting the components of the spatially indexed panoramic video system 10. The spatially indexed panoramic video system 10 may include one or more of a direct cable connection, a connection over a wide area network or a local area network, a connection over an Internet, a connection over the Internet, or a connection over any other distributed processing network or system. In general, the communication link 305 can be any known or later developed connection system.

Further, it should be appreciated that the communication link 305 can be a wired or wireless link to a network. The network can be a local area network, a wide area network, an Internet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A video system comprising:
   a database including spatial data;
   a user interface having an image display; and
   a video that is rendered in response to a specified action, wherein the video comprises a plurality of images retrieved from the database, and wherein each of the images is panoramic and spatially indexed in accordance with a predetermined position along a virtual path in a virtual environment, the virtual path being defined by coordinates in a coordinate system of the virtual environment.

2. The system of claim 1, wherein the user interface further comprises:
   a map display that is associated with the predetermined position, and wherein the virtual path is a predefined virtual path.

3. The system of claim 2, wherein the user interface further comprises:
   a text display illustrating spatial data that is associated with the predetermined position.

4. The system of claim 3, wherein the user interface further comprises:
   an audio output that conveys audio data associated with the predetermined position.

5. The system of claim 1, wherein the video system is a stand alone system.

6. The system of claim 1, wherein the video system is located on a server and the user interface is implemented as a client display program.

7. The system of claim 1, wherein the spatial data is at least one of a panoramic image, a map, text, an audio output and a hypertext link.

8. The system of claim 1, wherein the specified action is a request for virtual movement.

9. The system of claim 8, wherein the virtual movement is at least one of a direction of travel, stopping, defining a speed, snapping on an object to view, dragging a position icon, initiating a tour and panning.

10. The system of claim 8, wherein the specified action is selected by at least one selection device comprising at least one of a keyboard command, a mouse, a knob, a joystick, a head tracking device, a floating arrow indicator, floating text indicator, a pedal, a hypertext link indicator, joysticks, and controllers.

11. The system of claim 1, wherein the specified action is a request to render the video in a continuous presentation.

12. The system of claim 11, wherein the continuous presentation is a guided tour.

13. The video system of claim 1, wherein the virtual path is based on real-world coordinate positions.

14. The video system of claim 1, wherein the virtual path comprises a continuous virtual path.

15. A video system comprising:
   a controller;
   a database including spatial data and metadata;
   a user interface; and
   a video, displayed in the user interface, that is generated in response to a specified action, wherein the user interface includes:
      an image display in which a video is displayed, wherein the video comprises a plurality of images retrieved from the database;
      a map display illustrating spatial data associated with a position;
      a text display illustrating spatial data associated with the position; and
      an audio output that conveys audio data associated with the position;
      wherein each of the images is panoramic and spatially indexed in
   accordance with a predetermined position along a virtual path in a virtual environment, the virtual path being defined by coordinates in a coordinate system of the virtual environment.

16. The video system of claim 15, wherein the virtual path is based on real-world coordinate positions.

17. The video system of claim 15, wherein the virtual path comprises a continuous virtual path.

18. A method for generating a video for virtual reality comprising:
   specifying an action;
   generating a video along a virtual path in a virtual environment based on the specified action, the virtual path being defined by coordinates in a coordinate system of the virtual environment, wherein the video is both panoramic and spatially indexed in accordance with a position along the virtual path;
   providing a user interface; and
   displaying the video via the user interface.

19. The method of claim 18, further comprising:
   displaying a map that corresponds to the position along the virtual path, wherein the virtual path is a predefined virtual path.

20. The method of claim 19, further comprising:
   displaying text illustrating spatial data that corresponds to the position along the virtual path.

21. The method of claim 20, further comprising:
   outputting audio data associated with the position along the virtual path.

22. The method of claim 18, wherein specifying an action comprises:
   requesting virtual movement.

23. The method of claim 18, wherein the virtual path is based on real-world coordinate positions.

24. The method of claim 18, wherein the virtual path comprises a continuous virtual path.

25. A method for generating a video for virtual reality comprising:
   specifying an action along a virtual path in a virtual environment, the virtual path being defined by coordinates in a coordinate system of the virtual environment;
   processing a request corresponding to the specified action;
   retrieving a plurality of images that make up the video, wherein each of the images is panoramic and spatially indexed in accordance with a position along the virtual path;

providing a user interface having an image display window in which the video is displayed, and a map display window in which a map corresponding to the video is displayed; and rendering the video and the map on the user interface in response to the specified action.

26. The method of claim 25, wherein the virtual path is based on real-world coordinate positions.

27. The method of claim 25, wherein the virtual path comprises a continuous virtual path.

28. A control program stored on a computer-readable storage medium, the control program usable for providing a video for virtual reality to a device for executing the control program, the control program including instructions comprising:

instructions for specifying an action;

instructions for generating a video along a virtual path in a virtual environment based on the specified action, the virtual path being defined by coordinates in a coordinate system of the virtual environment, wherein the video is both panoramic and spatially indexed in accordance with a position along the virtual path;

instructions for providing a user interface; and instructions for displaying the video via the user interface.

29. The control program of claim 28, wherein the control program includes instructions comprising:

instructions for providing an image display;

instructions for providing a map display;

instructions for providing a text display; and instructions for providing an audio output.

30. The control program of claim 28, wherein the virtual path is based on real-world coordinate positions.

31. The control program of claim 28, wherein the virtual path comprises a continuous virtual path.

32. A computer readable storage medium, comprising:

computer readable program code embodied on the computer readable storage medium, the computer readable program code usable to program a computer to program a system that provides a video for virtual reality, comprising the steps of:

specifying an action;

generating a video along a virtual path in a virtual environment based on the specified action, the virtual path being defined by coordinates in a coordinate system of the virtual environment, wherein the video is both panoramic and spatially indexed in accordance with a position along the virtual path;

providing a user interface; and displaying the video via the user interface.

33. The storage medium of claim 32, wherein the virtual path is based on real-world coordinate positions.

34. The storage medium of claim 32, wherein the virtual path comprises a continuous virtual path.

* * * * *